ately filed on Oct. 6, 1978

United States Patent [19]
Kraayenhof

[11] 4,226,064
[45] Oct. 7, 1980

[54] FLOORING COMPRISING ADJOINING PLASTICS ELEMENTS

[76] Inventor: Hans Kraayenhof, 8 Vlosbergweg, Asten Holland, Netherlands

[21] Appl. No.: 870,469

[22] Filed: Jan. 18, 1978

[30] Foreign Application Priority Data

Feb. 2, 1977 [NL] Netherlands ............... 7701096

[51] Int. Cl.² ................................. B44D 5/08
[52] U.S. Cl. ................................. 52/180; 52/591
[58] Field of Search ............... 52/177, 180, 590, 591

[56] References Cited
U.S. PATENT DOCUMENTS

| | | | |
|---|---|---|---|
| 3,438,312 | 4/1969 | Becker et al. | 52/177 X |
| 3,802,144 | 4/1974 | Spica | 52/591 |
| 3,846,945 | 11/1974 | Roby | 52/177 |
| 3,909,996 | 10/1975 | Ettlinger, Jr. et al. | 52/177 |
| 4,008,548 | 2/1977 | Leclerc | 52/591 X |
| 4,018,025 | 4/1977 | Collette | 52/590 |

*Primary Examiner*—Price C. Faw, Jr.
*Assistant Examiner*—Carl D. Friedman
*Attorney, Agent, or Firm*—Robert S. Smith

[57] ABSTRACT

Flooring for stables and the like consisting of adjoining plastic elements interconnected by means of provisions formed in the material of the element.

3 Claims, 7 Drawing Figures

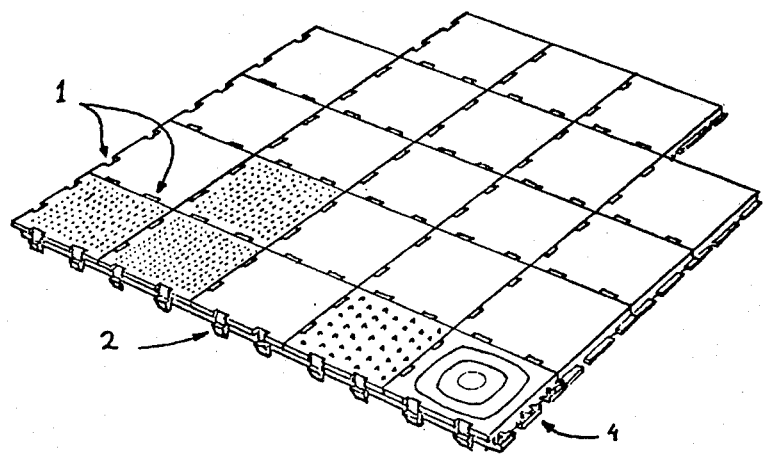
FIG. 1
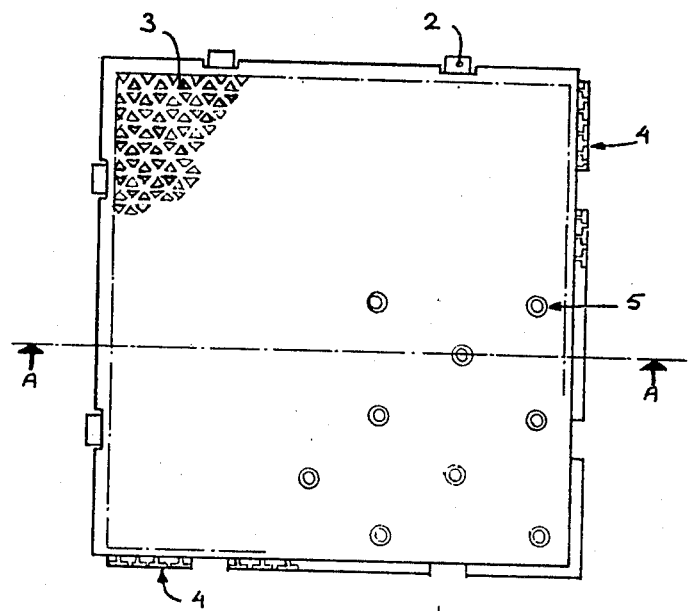
FIG. 2
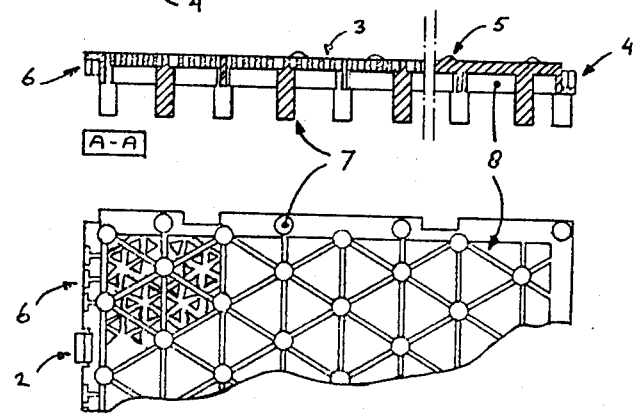
FIG. 3
FIG. 4

FLOORING COMPRISING ADJOINING PLASTICS ELEMENTS

The invention relates to a flooring which comprises plastic elements which can be connected and locked together by means of provisions formed in the material of the element during the moulding process. Removing the locked condition enables the elements to be detached. For this purpose their upper parts have holes through which the locked condition can be removed, for example by means of a screwdriver.

Compared to known floorings which comprise adjoining plastic elements fastened to the sub-floor, for example, by glueing, the flooring according to the invention has many advantages such as independence of the shape, the material or the finishing of the sub-floor owing to the fact that the elements when interconnected cannot shift with respect to one another in any direction.

The accuracy of the interconnection provisions ensures perfect joining of the elements, enabling the flooring to be laid by a single unskilled laborer, while the flooring can be removed in manageable parts or, for example, damaged elements can be replaced by unlatching the relevent locking arrangements. The flooring can be used both indoors and out of doors and can be made of a variety of materials in various colors and surface textures.

The best design and construction of the elements are obtained by manufacturing them of the plastics of the polyolefine and in particular of polypropylene and HD polyethylene group since these materials combine great strength, high resistance to wear, elasticity and a low specific weight with a comparatively low cost, while the poor adherence of dirt to these materials facilitates cleaning.

According to the requirements of the use to which the flooring is to be put, in principle all thermoplastic synthetic resin and rubber combinations are suitable as basic materials, while injection moulding is a rational technique of manufacturing the elements.

The upper surface of the elements may be provided with a decorative or anti-slip contour in the moulding process.

The flooring according to the invention will be used especially in industrial premises, public buildings, hospitals and the like, but particularly in places where its specific properties appear to full advantage, notably its ability to act as a heat and moisture barrier, which can be realized most effectively by shaping the bottom of each element so that cavities or ducts are produced. If those are interconnected to form a system of drains which are connected to openings in the upper surface of the elements, a liquid-permeable or draining flooring is obtained which has specific fields of application, such as the dairy industry, laundries, electroplating works, slaughterhouses, swimming baths, fish markets, car-washing plants, shower cabinets and stables.

Although porous concrete tiles and plastic draining mats are known, the flooring according to the invention in the draining embodiment is related more closely to that described in Netherlands Patent Specification No. 54,382 entitled: "Flooring for sheds and stables, in particular for pigsties, comprising courses of bricks laid on a supporting surface, each brick having a recess in its bottom so that each row together with the supporting surface forms a draining duct". The said bricks have holes in their upper surfaces in the central plane, but all the holes together form a very small part of the entire surface area so that liquid falling on the bricks can only pass slowly and partly through these holes. Because the bricks are not interconnected, the supporting surface must have a smooth finish. In a liquid-permeable embodiment in which the holes in the upper surfaces of the bricks are uniformly distributed, form at least 10 percent of the surface area and have a size such that solid material particles having a diameter of, for example, more than 2 mm cannot pass through, the flooring according to the invention is particularly suitable for use in horse stables. Because urine is drained off substantially immediately, straw and hay remain dry, which means an important saving in cost and labor. The thermally insulating properties of the flooring are of great benefit to the health of the horses, while the elements and, through them, the sub-floor can readily be cleaned, for example, by hosing, and the small sizes of the individual holes in the upper surface do not interfere with the use of normal stable implements and prevent the loss of litter and fodder.

If the elements have large apertures or are constructed as gratings having comparatively thin vertical connecting pieces, they are suitable as, for example, lawn reinforcement to protect the grass and the ground against damage in, for example, paths, drives, playgrounds and airfields.

Embodiments of the flooring according to the invention are shown, by way of example, in the drawings.

FIG. 1 shows the flooring comprising elements of different constructions;

FIG. 2 is a plan view of an element;

FIG. 3 is a sectional view taken along the line A—A of FIG. 2, the left-hand portion of the upper part of the element being shown as draining and the right-hand one as closed;

FIG. 4 is a bottom plan view of part of an element;

Figure 5:
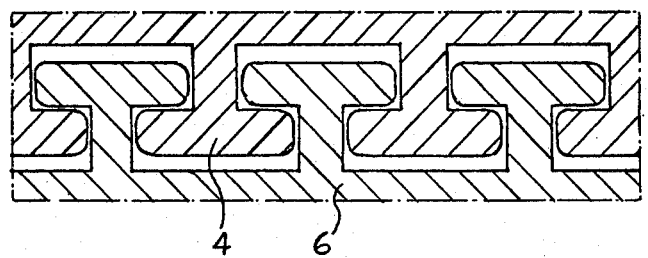
FIG. 5 is a sectional view taken through a horizontal plane.
Figure 6:
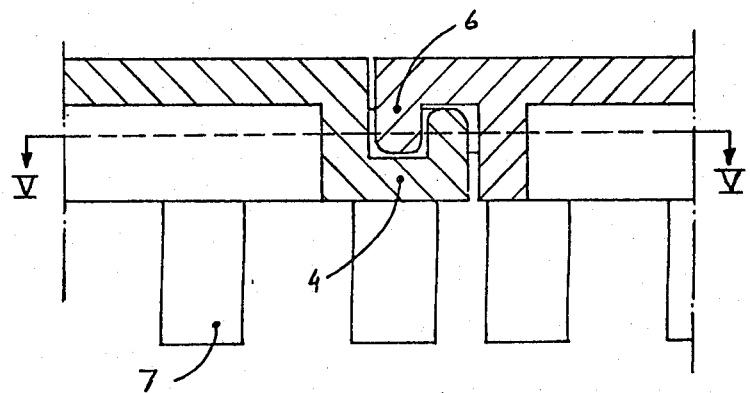
FIG. 6 is a sectional view taken through a vertical plane, of the interconnection arrangements of two elements in the engaged condition.
Figure 7:
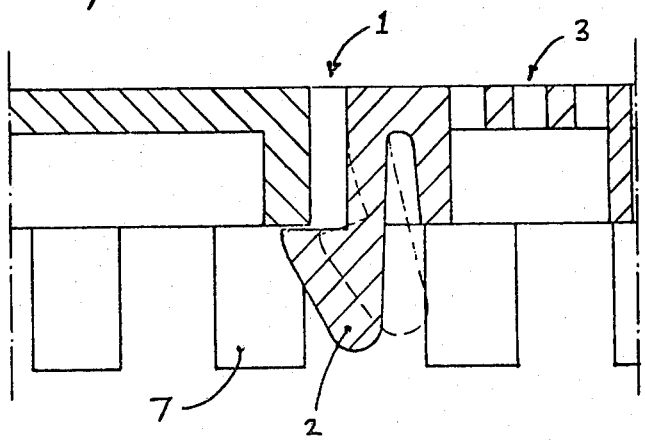
FIG. 7 is a sectional view, taken through a vertical plane, of the locking arrangement of two elements.

The flooring can be composed of elements of different constructions, which can be unlocked through holes by moving locking pawls 2 to the position shown in broken lines in FIG. 7.

In the draining embodiment the upper surface is formed with holes 3 while an anti-slip contour as shown at 5 may be provided. In one form the holes are configured as truncated cones with the narrowest portion uppermost. This avoids problems with obstruction by solid matter. An element has lower flanges 6 which in the moulding process have been provided with connecting members in the form of T-shaped lugs, which may engage in the vertical direction. At its bottom the element has foot-shaped projections which together with the supporting surface form insulating chambers or a system of draining ducts. The feet 7 are joined in stable relationship to the upper part of the element by ridges 8.

What is claimed:

1. Flooring which comprises: a plurality of adjoining perforate generally planar plastic elements, each of said elements including first means connecting and locking together adjacent elements, said first means being formed in the material of each element during the moulding thereof, said first means including depending pawls which are selectively engageable with an adjacent element, said pawls being disposed on each of said elements to engage automatically on interconnection of adjacent elements, each of said elements further including second means to terminate the interlocked condition of adjacent elements, said second means to terminate including third means to shift said pawl, said second means to terminate being accessible from the upper surface of said flooring.

2. Flooring which comprises: a plurality of adjoining perforate generally planar plastic elements, each of said elements including first means connecting and locking together adjacent elements, said first means being formed in the material of each element during the moulding thereof, said first means including depending pawls which are selectively engageable with an adjacent element, said pawls being disposed on each of said elements to engage automatically on interconnection of adjacent elements, wherein each of said elements includes depending members to maintain most of said element in spaced relationship from an associated supporting surface, the lower parts of said elements forming a system of interconnecting ducts which are in fluid communication with each other and with the perforations in said elements.

3. Flooring as claimed in claim 2 wherein said perforations in said generally planar surface of each element are uniformly distributed over the entire surface area thereof and collectively comprise at least 10 percent of the area thereof, said perforations having openings having a cross-section with such dimensions that no circle with a diameter larger than 2 mm. can be defined therein.

* * * * *